(12) United States Patent
Lambert

(10) Patent No.: US 10,264,660 B2
(45) Date of Patent: Apr. 16, 2019

(54) BEAM TRAP, BEAM GUIDE DEVICE, EUV RADIATION GENERATING APPARATUS, AND METHOD FOR ABSORBING A BEAM

(71) Applicant: TRUMPF Lasersystems for Semiconductor Manufacturing GmbH, Ditzingen (DE)

(72) Inventor: Martin Lambert, Korb (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 15/691,084

(22) Filed: Aug. 30, 2017

(65) Prior Publication Data

US 2017/0367167 A1 Dec. 21, 2017

Related U.S. Application Data

(63) Continuation of application No. PCT/EP2015/054507, filed on Mar. 4, 2015.

(51) Int. Cl.
*H05G 2/00* (2006.01)
*G02B 5/00* (2006.01)
*B23K 26/70* (2014.01)

(52) U.S. Cl.
CPC ........... *H05G 2/008* (2013.01); *B23K 26/704* (2015.10); *G02B 5/003* (2013.01)

(58) Field of Classification Search
CPC ...... F24S 2023/872; F24S 23/80; F24S 23/71; F24S 80/50; Y02E 10/45; Y02E 10/41;
(Continued)

(56) References Cited

U.S. PATENT DOCUMENTS 4,385,430 A * 5/1983 Bartels ............. H02S 40/44
29/458
4,511,216 A * 4/1985 Hsu ............. H01S 3/005
359/864
(Continued)

FOREIGN PATENT DOCUMENTS

CN 1564076 1/2005
CN 104133295 11/2014
(Continued)

OTHER PUBLICATIONS

International Search Report for PCT Application No. PCT/EP2015/054507, dated Dec. 10, 2015, 6 pages.
(Continued)

*Primary Examiner* — David A Vanore
(74) *Attorney, Agent, or Firm* — Fish & Richardson P.C.

(57) ABSTRACT

The disclosure relates to a beam trap including: a reflector for reflecting a beam, in particular a laser beam, that is incident on a surface of the reflector, and an absorber device for absorbing the beam reflected at the surface of the reflector. The surface of the reflector is segmented and has a plurality of reflector regions that are configured for reflecting a respective partial beam of the incident beam into an absorber region of the absorber device that is associated with the respective reflector region. The disclosure also relates to a beam guide device having a beam trap of this type, an EUV radiation generation apparatus having a beam guide device of this type, and an associated method for absorbing a beam, in particular for absorbing a laser beam.

18 Claims, 3 Drawing Sheets

(58) Field of Classification Search
CPC ... H01L 31/0547; H01L 31/054; G02B 5/003; H01S 3/0064; H01S 3/0604
USPC .............. 126/600, 651, 696, 680, 684, 685; 359/864, 885; 372/67, 9, 94, 99
See application file for complete search history.

(56) References Cited

U.S. PATENT DOCUMENTS

| | | | |
|---|---|---|---|
| 4,864,098 A | 9/1989 | Basanese et al. | |
| 6,035,850 A * | 3/2000 | Deidewig | F24S 23/82 126/696 |
| 9,651,277 B2 * | 5/2017 | Hansen | F24J 2/02 |
| 2005/0041718 A1 * | 2/2005 | Eisenbarth | H01S 3/0604 372/94 |
| 2008/0087277 A1 * | 4/2008 | Schweyher | F24S 30/40 126/694 |
| 2008/0179303 A1 | 7/2008 | Garry | |
| 2009/0056703 A1 * | 3/2009 | Mills | H01L 31/054 126/692 |
| 2011/0017273 A1 * | 1/2011 | Roach | F24D 11/0221 136/246 |
| 2011/0140008 A1 | 6/2011 | Bergstedt et al. | |
| 2011/0303214 A1 * | 12/2011 | Welle | F24J 2/07 126/578 |
| 2014/0048121 A1 * | 2/2014 | Schwartz | H01L 31/0547 136/248 |
| 2017/0367167 A1 * | 12/2017 | Lambert | G02B 5/003 |

FOREIGN PATENT DOCUMENTS

| | | |
|---|---|---|
| CN | 104142301 | 11/2014 |
| DE | 3027590 A1 | 2/1982 |
| DE | 10033787 A1 | 1/2002 |
| DE | 102010036161 A1 | 3/2012 |
| DE | 102012219635 A1 | 2/2014 |
| EP | 1950000 A1 | 7/2008 |
| JP | 60119502 A | 6/1985 |

OTHER PUBLICATIONS

Notification of Transmittal of Translation of the International Preliminary report on Patenability for PCT Application No. PCT/EP2015/054507, dated Sep. 14, 2017, 10 pages.

Office Action in Chinese Application No. 201580077421.7, dated Sep. 17, 2018, 15 pages (with English translation).

* cited by examiner

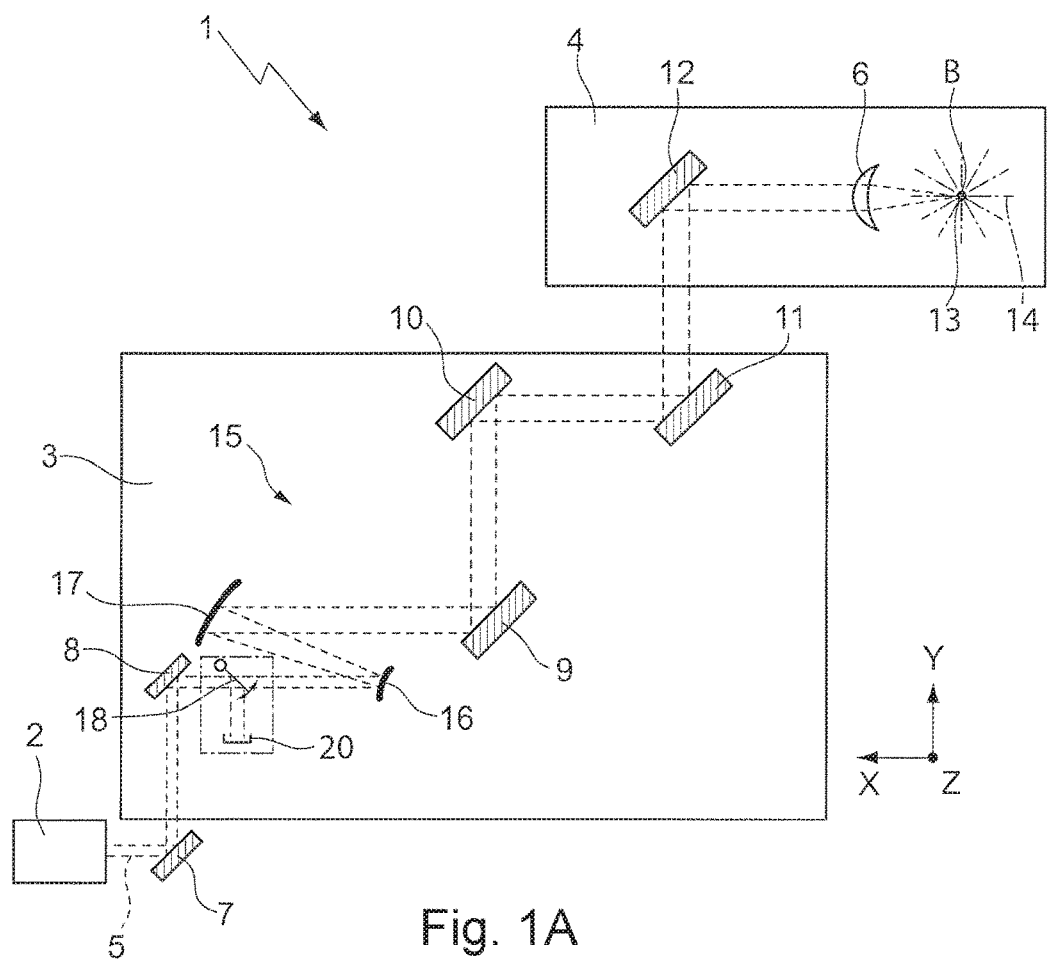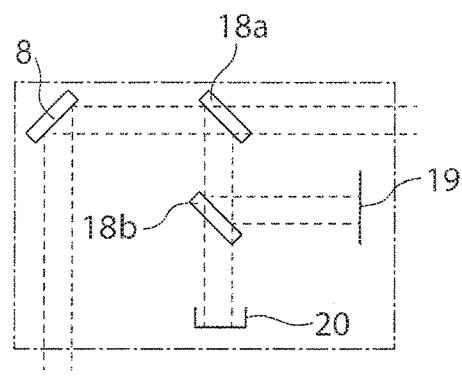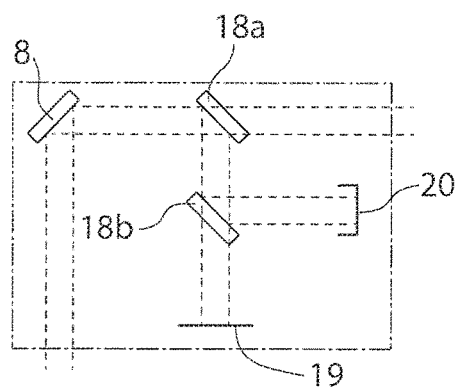
Fig. 1A
Fig. 1B
Fig. 1C

BEAM TRAP, BEAM GUIDE DEVICE, EUV RADIATION GENERATING APPARATUS, AND METHOD FOR ABSORBING A BEAM

CROSS-REFERENCE TO RELATED APPLICATION

This application is a continuation of and claims priority under 35 U.S.C. § 120 to PCT Application No. PCT/EP2015/054507 filed on Mar. 4, 2015. The entire contents of this priority application is incorporated herein by reference.

TECHNICAL FIELD

The disclosure relates to a beam trap and to a beam guide device, having such a beam trap, for guiding a laser beam in the direction of a target region for generating EUV radiation. The disclosure also relates to an EUV radiation generating apparatus having such a beam guide device, and to a method for absorbing a beam, in particular for absorbing a laser beam.

BACKGROUND

A beam trap for absorbing radiant energy of undesired laser radiation is disclosed in DE 10 2010 036 161 A1. The beam trap described there includes two reflectors, where at least one of the two reflectors is provided with a coating that absorbs radiant energy. The two reflectors are positioned relative to one another such that the laser radiation, which is incident on a first reflector and is then reflected, is directed onto the second reflector. The laser radiation, which is incident on the second reflector and then reflected, is directed back onto the first reflector, with the result that the radiant energy of the laser radiation is absorbed after multiple reflections and the resulting continuous partial absorption.

EP 1 950 000 A1 describes an apparatus having a beam generator for generating a beam, and having a beam trap device. The beam trap device has aluminum plates having planar surfaces which are located opposite one another. The beam is directed onto the beam trap device and destroyed in the beam trap device as a result of repeated reflection from the first to the second surface and from the second to the first surface.

Back reflections coming from beam traps have a disturbing effect on the functionality of optical arrangements in which the beam traps are used. For this reason, it is advantageous if a beam trap absorbs the radiant energy of an incident beam to the greatest possible degree. The problem arises in conventional beam traps, in particular in the case in which the power of the incident beam is very high, for example more than approximately 50 kW, that the radiant energy may not be able to be absorbed completely. In addition, degradation phenomena of the materials used in the beam trap may occur when using beam traps for absorbing (pulsed) high-power laser beams.

SUMMARY

It is an object of the present implementations to develop a beam trap such that it practically completely absorbs the radiant energy of incident beams, in particular of laser beams, even at a very high radiant power.

This object can be achieved by way of a beam trap, including: a reflector for reflecting a beam, in particular a laser beam, that is incident on a surface of the reflector, and an absorber device for absorbing the beam reflected at the surface of the reflector, where the reflector has a segmented surface having a plurality of reflector regions, which are configured for reflecting a respective partial beam of the incident beam into an absorber region of the absorber device that is associated with the respective reflector region.

The incident beam is split into a plurality of partial beams at the segmented surface of the reflector, e.g., the reflector serves as a splitting mirror. The reflector regions of the surface are differently aligned and/or curved, with the result that the partial beams reflected at different reflector regions leave the reflector in different directions and are reflected into different absorber regions of the absorber device. The radiant energy that is incident on the reflector can in this way be distributed over a plurality of absorber regions, as a result of which the radiant energy that is to be absorbed by a particular absorber region is reduced. A respective partial beam can be absorbed more efficiently in the respective absorber region than would be the case if the absorber region had to absorb the entire radiant energy. The absorber regions are in each case located at a distance (in some cases, a slight distance) from one another.

In one embodiment, the segmented surface forms a circumferential, preferably rotation-symmetrical lateral surface of the reflector. The lateral surface of the reflector can be configured in particular to be rotation-symmetrical about a central axis. The radiant energy of a beam that is incident along the central axis can in this way be distributed uniformly in the circumferential direction. The reflector or the segmented surface can form a substantially conical lateral surface. What is meant by a substantially conical lateral surface is that the individual reflector regions or segments of the surface do not necessarily form a continuous conical surface, as is the case for example in the lateral surface of a cone. Instead, the individual reflector regions can have a curvature and/or different alignments. The reflector or the segmented, substantially conically extending surface additionally serves for expanding the incident beam. Partial beams which are reflected by adjacent reflector regions of the surface can be reflected into adjacent absorber regions, although this is not absolutely necessary.

In a further embodiment, the reflector regions are arranged concentrically around a central axis of the reflector. The central axis can be in particular an axis of rotational symmetry of the reflector or of the lateral surface. Due to the concentric arrangement of the reflector regions around the central axis, the radiant energy of a beam which is incident on the reflector along the central axis can be distributed in the radial direction substantially uniformly over a plurality of different absorber regions which can be arranged, for example, along the central axis one above the other, as will be described in more detail below.

In a further embodiment, the reflector regions are configured in the form of paraboloid or toroidal surfaces. A respective paraboloid surface can forms a (e.g., circular) ring-shaped surface which extends rotation-symmetrically with respect to a central axis of the reflector. Radiation which is incident on the paraboloid surface parallel to the central axis of the reflector is reflected at such a paraboloid surface in the form of a partial beam and propagates in the direction of a focus of the paraboloid surface. A paraboloid surface can be approximated in a good approximation in the present application by a toroidal surface. A toroidal surface forms a (e.g., circular) ring-shaped surface which extends rotation-symmetrically with respect to a central axis of the reflector and has a constant curvature or a constant radius of curvature. The toroidal surface can be concavely curved so as to reflect radiation that is incident parallel to the central axis in the form of a partial beam in the direction of a focus of the toroidal surface. Owing to the paraboloid or toroidal surface, it is thus possible to bundle the radiant energy of the respective partial beam, and the separation of partial beams which are reflected into adjacent absorber regions can be improved. What can be achieved in particular in this way is that no radiation proportions or only minor radiation proportions of the partial beams are reflected between two adjacent absorber regions.

In some implementations, a ring-shaped (or circular) line focus of a respective paraboloid or toroidal surface of a reflector region is formed between the respective paraboloid or toroidal surface and an associated absorber region. The parabolic or toroidal surface, or the parabolic or toroidal profile, can form a ring surface which extends rotation-symmetrically around a central axis (e.g., an axis of symmetry) of the reflector, or, in the case of the central reflector region which contains the central axis, a conically extending circular surface. The paraboloid surface focuses a beam that is incident parallel to the central axis of the paraboloid surface into a ring-shaped or circular line focus. The axes of symmetry of all paraboloid surfaces of the reflector can be identical and coincide with the central axis of the reflector. The same is true for the case where the reflector regions are configured in the form of toroidal surfaces.

Since the radiation that is reflected by the reflector to the absorber device passes through a respective line focus, the radiation that may not have been entirely absorbed within the respective absorber region must also again pass through the line focus in order to get back to the reflector or to the respective reflector region. The ring-shaped line focus thus adds a constraint in the beam trap, which makes the emergence of radiation from the beam trap unlikely.

In a further embodiment, the reflector is formed from a metallic material, in particular copper. The reflector can be formed as a (e.g., solid) metallic body, such as copper, in which cooling channels might be provided in order to cool the metallic body with a liquid, for example water. Copper has a high reflectivity (e.g., greater than 98%) for radiation over a comparatively large wavelength range, with the result that the application of a reflective coating on the surface of the reflector may be omitted. With sufficient cooling, the bare copper surface of the reflector will not be heated in an inadmissible fashion, with the result that said surface is not damaged by the high power of the incident radiation.

In a further embodiment, the absorber device has a cylindrical opening for the passage of the beam to the segmented surface of the reflector. The cylindrical opening of the absorber device can be aligned parallel with respect to the central axis of the (e.g., rotationally-symmetric) reflector. The cylindrical axis of the cylindrical opening of the absorber device generally coincides with the central axis of the reflector. The laser radiation that is reflected at the segmented surface of the reflector can in this way be distributed in the peripheral direction uniformly over the absorber regions of the absorber device. The segmented surface of the reflector can be arranged with respect to the absorber device such that the absorber device is located in the axial direction at a distance from the segmented surface, but it is also possible for the segmented surface and the absorber device to at least partially overlap in the axial direction.

In a further embodiment, a respective absorber region of the absorber device is configured as an absorber chamber having an in particular ring-shaped entrance opening for a respective partial beam of the incident beam. The (e.g., ring-shaped) entrance opening can form a portion or a partial region of the cylindrical opening of the absorber device. The partial beam that is reflected by a respective reflector region enters the absorber chamber through the entrance opening, and the respective partial beam is ideally completely absorbed therein. The entrance openings of adjacent absorber chambers can be separated from one another for example by way of plate-like components that themselves form part of a respective absorber chamber or of the two adjacent absorber chambers and can be aligned at least in the region of the entrance opening perpendicular to the central axis of the reflector.

In some implementations, the absorber chamber is formed between two preferably planar absorber surfaces which have parallel alignment. The absorber surfaces can form the surfaces of plate-like, in particular planar components with parallel alignment. The absorber surfaces generally do not have an overly large absorptivity or an overly large absorption coefficient for the incident partial beam, because the intensity of the incident partial beam is often so great that the absorber surface could be destroyed if it completely absorbed the incident partial beam. The absorber surfaces therefore can have an absorptivity of less than 80%, but generally more than approximately 10%, for the incident partial beam, e.g., the absorber surfaces have a relatively large reflectivity (per reflection), since no transmission takes place. Due to the parallel alignment of the absorber surfaces, the radiation is reflected repeatedly to and fro between the absorber surfaces until the radiation is completely absorbed. The radial extent of the absorber surfaces or of the components can be dimensioned such that the number of reflections between the absorber surfaces suffices (in some cases, nearly suffices) to completely absorb the radiant energy of the partial beam which enters the absorber chamber. The radiation can be reflected to and fro maybe several thousands of times in the respective absorber chamber until complete absorption.

Each scattering center in the absorber chamber sends radiation back possibly on a direct path and can, in sum, result in a noteworthy proportion of radiant energy that is not absorbed by the beam trap. Scattering of radiation in the respective absorber chamber is thus counter to the object of absorbing the radiant energy as completely as possible. The absorber chambers or the absorber surfaces of the absorber chambers should therefore have a configuration that is as smooth as possible in order to prevent undesired scattering effects. An absorptivity of greater than 50% per reflection can also be achieved with relatively smooth absorber surfaces which thus exhibit little scattering.

In some implementations, the absorber chamber has, at an end that is located opposite the entrance opening, a termination surface which is provided between the absorber surfaces. Owing to the installation space that is available, the extent of the absorber chambers in a direction perpendicular to the central axis of the reflector cannot be chosen to be of arbitrary size. To prevent a small proportion of the radiant energy from emerging at the end of the absorber device that is located opposite the cylindrical opening, the absorber chamber can be closed off by way of a termination surface. The termination surface can likewise be configured in the form of an absorber surface to receive part of the radiant energy.

In some implementations, the termination surface is aligned at an angle of between 30° and 60°, preferably at an angle of 45°, with respect to one of the absorber surfaces. Because of the alignment at an angle with respect to the absorber surfaces, a non-absorbed part of the radiant energy of the partial beam can be reflected to and fro several times between the termination surface and one of the absorber surfaces in order to completely absorb the radiant energy of the partial beam in the respective absorber chamber. The unavoidable theoretical proportion of the radiant energy of the incident beam that leaves the beam trap again can in this way also be reduced even at radiant powers of 100 kW and more to a few milliwatts or possibly even further. In order to keep the radial extent of the absorber chambers as small as possible, it is favorable if both the absorber surfaces and the termination surface have high absorptivity and low roughness, which can be achieved for example by using an absorbing coating.

In a further embodiment, the two absorber surfaces and the termination surface are formed on three interconnected plate-like, in particular metallic components. The absorber surfaces can be formed for example at two side faces which face toward each other of two plane-parallel metal plates or metal sheets, and the termination surface can be formed at an edge of an opening, extending at an angle, of a further metallic, plate-like component. The further plate-like component can in this case be provided between the two components having the absorber surfaces and form a spacer between the two components. The side faces which face away from one another of the two components can serve as absorber surfaces for two further, adjacent absorber chambers. A plurality of plate-like components stacked on top of one another can be fixed in their relative location with respect to one another, for example using a holder, without necessarily needing an integral connection of the individual plate-like components for this purpose. However, the two components which form the parallel absorber surfaces of the absorber chamber can also be connected to the component which is located there between and on which the termination surface is formed by way of an integral connection, for example by way of adhesive bonding or by soldering.

In some implementations, at least one of the components has a plurality of plates which are connected to one another preferably by way of soldering. Such a component can have, for example, two external plates on whose external sides are formed the absorber surfaces of mutually adjacent absorber chambers. The external plates can be configured as a full surface (with the exception of the region in which the entrance opening is formed). One or more internal plates that can have cavities can be provided between the two external plates. The three or more plates of such a component can be connected to one another by way of an integral connection. Preferably, the three or more plates are connected to one another by way of soldering, for example by soldering using soldering film in a soldering furnace. It has been shown that the soldering connection has significant advantages with respect to thermal stability and process reliability as compared to any other type of integral connection, such as adhesive bonding, and thus represents the preferred manufacturing method.

In some implementations, at least one cooling channel is formed in at least one of the plates of the plate-like component. The radiant energy absorbed by the absorber device can be removed via a cooling liquid, for example in the form of cooling water. It is advantageous if the cooling liquid flows directly through the component on which a respective absorber surface is formed. To this end, cooling channels can be introduced in a respective plate-like component that has the absorber surface or the termination surface. The cooling channels can be introduced directly into the respective (e.g., sheet-metal) blank of one or more internal plates during the manufacture of the component in a layer-wise construction having a plurality of plates in order to implement the desired cooling channel geometry or cooling chamber geometry. It is to be understood that the cooling channel can be introduced into one or more of the internal plates before the plates are connected to one another to produce the component.

A further aspect of the invention relates to a beam guide device for guiding a laser beam in the direction of a target region for generating EUV radiation, including: a beam trap which is configured as described further above. A beam guide device of this type serves for guiding a (e.g., pulsed) laser beam which was generated and amplified in a beam generating device. The beam guide device guides the laser beam from the beam generation device to a focusing element or to a focusing device which serves to focus the laser beam into a target region in which a target material is provided which, upon being irradiated with the laser beam, transitions into a plasma state and emits EUV radiation in the process.

In a beam guide device of this type, a proportion of the radiant energy or of the power of the laser beam can be coupled out of the beam path between the beam generation device and the target material by way of a beam splitter, for example in order to monitor the beam properties of the laser beam. For monitoring, the coupled-out proportion of the laser radiation is incident on a detector, the surface of which can receive only limited radiant power without being destroyed in the process. By using a further beam splitter, the radiant power can be reduced to a point where the admissible intensity on the detector is not exceeded even under extremely high laser powers. In this case, a proportion of the radiant energy of the coupled-out laser beam which is not required for the diagnosis can be absorbed by way of the beam trap. Alternatively or additionally, a beam trap can also serve to absorb the entire radiant energy or radiant power of the laser beam from the beam path between the beam generation device and the target material. In this case, the laser beam is deflected to the beam trap, for example by way of a displaceable or pivotable deflection mirror which is inserted into the beam path. Such a process can be advantageous for example during test operation of the beam generation device.

In some implementations, the beam guide device is configured for guiding a $CO_2$ laser beam or a solid-state laser beam. For guiding a $CO_2$ laser beam, e.g., a laser beam having a wavelength of approximately 10.6 μm, reflective optical elements are preferably used. These can include metallic materials, e.g., copper, at least in the region of their surfaces, onto which a reflective coating may be applied. Transmissive optical elements can also be used for the beam guidance of $CO_2$ laser radiation. However, there is only a small number of materials that are transparent for $CO_2$ laser radiation. One example of such a material is zinc selenide, which can also be used for producing lenses, among other things. Alternatively, the laser beam can be generated by a solid-state laser, which generates a wavelength of, for example, approximately 1 μm. In this case, the reflector can also be formed from a metallic material, for example copper. When using a solid-state laser beam, but possibly also when using a $CO_2$ laser beam, the beam trap may be arranged in the radiation generation device itself.

A further aspect relates to an EUV radiation generation apparatus, including: a beam generation device for generating a laser beam, a vacuum chamber into which a target material is able to be brought into a target region for generating EUV radiation, and a beam guide device as described further above for guiding the laser beam from the beam generation device in the direction of the target region.

The EUV radiation generation apparatus can be used, for example, as an EUV light source in an EUV lithography system.

A further aspect relates to a method for absorbing a beam, in particular a laser beam, including: reflecting partial beams of the beam that is incident on a segmented surface of a reflector at a plurality of reflector regions of the segmented surface in each case in the direction of an absorber region of an absorber device that is associated with the respective reflector region, and absorbing the partial beams in the absorber regions. Practically no radiation can travel back to the reflector from the absorber regions, in particular in the case in which the partial beams are reflected to the absorber regions in each case by way of a ring-shaped line focus.

Further advantages can be found in the description and the drawings. The previously mentioned features and the features mentioned below can likewise be used individually or together in any desired combinations. The illustrated and described embodiments are not to be understood as a complete list, but are rather exemplary for illustrating the invention.

In the drawings:

DESCRIPTION OF DRAWINGS

FIG. 1A shows a schematic illustration of an EUV radiation generation apparatus having a beam guide device having a beam trap for absorbing the radiant energy of a laser beam which is completely coupled out of a beam path of the EUV radiation generation apparatus, FIGS. 1B and 1C show two illustrations of a detail of the EUV radiation generation apparatus of FIG. 1A having a beam trap and having two beam splitters.

Figure 2:
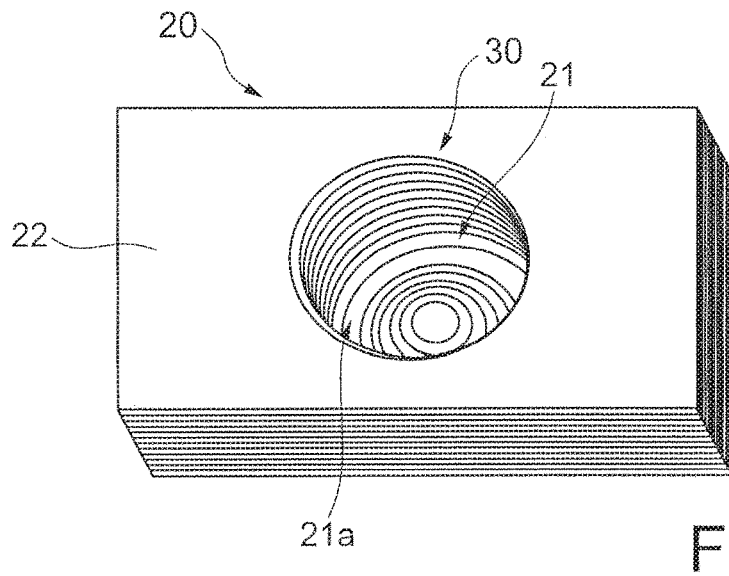
FIG. 2 shows a perspective illustration of the beam trap of FIGS. 1A-1C, having a reflector and an absorber device.

Identical reference signs will be used in the description of the drawings below for identical components or components having identical functions.

Like reference symbols in the various drawings indicate like elements.

DETAILED DESCRIPTION

FIG. 1A shows an EUV radiation generation apparatus 1 having a beam generation device 2 (e.g., beam source), a beam guide chamber 3, and a vacuum chamber 4. A focusing device in the form of a focusing lens 6 is arranged in a vacuum environment which prevails in the vacuum chamber 4 in order to focus a $CO_2$ laser beam 5 in a target region B. The EUV radiation generation apparatus 1 shown in FIG. 1A substantially corresponds to the construction as described in US 2011/0140008 A1, which is incorporated in this application by reference.

The beam generation device 2 includes a $CO_2$ beam source and a plurality of amplifiers for generating a laser beam 5 having a high radiant power (e.g., greater than 1 kW). For a detailed description of examples of possible configurations of the beam generation device 2, reference is made to US 2011/0140008 A1. The laser beam 5 is deflected from the beam generation device 2 by way of a plurality of deflection mirrors 7 to 11 of the beam guide chamber 3 and a further deflection mirror 12 in the vacuum chamber 4 onto the focusing lens 6, which focuses the laser beam 5 in the target region B at which tin is arranged as the target material 13. Additionally or alternatively to a transmissive optical element, one or more reflective elements can also serve as the focusing device. Alternatively or additionally to a $CO_2$ beam source, the beam generation device 2 can also have another beam source, for example a solid-state laser, which generates laser radiation at other wavelengths, for example of approximately 1 μm.

The target material 13 is struck by the focused laser beam 5 and in the process transitions into a plasma state, which serves for generating EUV radiation 14. The target material 13 is supplied to the target region B by way of a supply device (not shown), which guides the target material 13 along a specified path that intersects with the target region B. For details of the supply of the target material, reference is again made to US 2011/0140008 A1.

FIG. 1A likewise illustrates a device for increasing the beam diameter of the laser beam 5, which has a first off-axis parabolic mirror 16 having a first, convexly curved reflective surface, and a second off-axis parabolic mirror 17 having a second, concavely curved reflective surface. The reflective surfaces of a respective off-axis parabolic mirror 16, 17 form the respective off-axis segments of an (elliptic) paraboloid. The term "off-axis" means that the reflective surfaces do not contain the axis of rotation of the paraboloid (and thus also do not contain the apex of the paraboloid).

The optical elements 7 to 11, 16, 17, 12, 6 together form a beam guide device 15 for guiding the laser beam 5 into the target region B. It is possible for one or more beam traps 20 which can fulfill different functions to be arranged inside the beam guide device 15, possibly also in the beam generation device 2 itself. FIG. 1A shows an EUV radiation generation apparatus 1, in which the entire power of the laser beam 5 exiting the beam generation device 2 can be deflected toward the beam trap 20 by way of a deflection means in the form of a foldable or pivotable deflection mirror 18.

FIG. 1A shows the beam path of the laser beam 5 both during regular operation of the EUV radiation generation apparatus 1 and during test operation, in which the deflection mirror 18 deflects the radiant power of the laser beam completely toward the beam trap 20, with the result that said laser beam no longer reaches the target region B. During test operation, the entire radiant power of the laser beam 5 is thus deflected towards the beam trap 20 and absorbed thereby, as will be described further below. During regular operation, the laser beam 5 does not strike the deflection mirror 18, and is transmitted to the target region B.

FIG. 1B shows a detail or a section of the EUV radiation generation apparatus 1 of FIG. 1A, in which, for the purpose of monitoring the beam path of the laser beam 5, a device for monitoring the laser beam 5 is arranged in a beam guide space of the beam guide chamber 3, which device has a first beam splitter 18a in the form of a transmissive plane-parallel plate which is aligned at an angle, e.g., an angle of 45°, with respect to the beam direction of the laser beam 5 in order to couple out a portion, for example approximately 1%, of the radiant power of the laser beam 5 from the beam path or to deflect it to the target region B. The material of the plane-parallel plate 18a can be, for example, diamond. The coupled-out portion of the laser beam 5 strikes a second beam splitter 18b, which is likewise configured in the form of a plane-parallel plate and is arranged at an angle, for example an angle of 45°, with respect to the coupled-out portion of the laser beam 5. Only a small proportion of the incident radiation is reflected at the second beam splitter 18b to a detector 19, while most (e.g., approximately 99%) of the radiation is transmitted by the second beam splitter 18b and is incident on the beam trap 20. The material of the second plane-parallel plate 18b can be, for example, zinc selenide.

The arrangement shown in FIG. 1C differs from the arrangement shown in FIG. 1B in that the second beam splitter 18b is configured in the form of a partially transmissive mirror which deflects most of the radiation (e.g., >99%) toward the beam trap 20. The small proportion of the radiation of the laser beam 5 (for example approximately 1%) that is transmitted by the second beam splitter 18b is incident on the detector 19. The arrangement shown in FIG. 1C has the advantage, as compared to the arrangement shown in FIG. 1B, that only a comparatively small portion of the radiant power is transmitted by the second beam splitter 18b.

In the arrangements shown in FIGS. 1B and 1C, radiant power that is incident on the detector 19 is reduced to an acceptable level by way of the two beam splitters 18a, 18b, with the result that the detector 19 is not damaged by the incident radiation. A significant proportion of the radiant power of the laser beam 5 that is not required for analysis is incident on the beam trap 20, which serves for the complete (in some cases, almost complete) absorption of the radiant power or radiant energy of the incident laser beam 5. It is to be understood that the arrangement shown in FIG. 1A having the beam trap 20, on which the entire laser power is incident, can be implemented with one of the arrangements shown in FIG. 1B or FIG. 1C in one and the same EUV radiation generation apparatus 1.

Figure 3A:
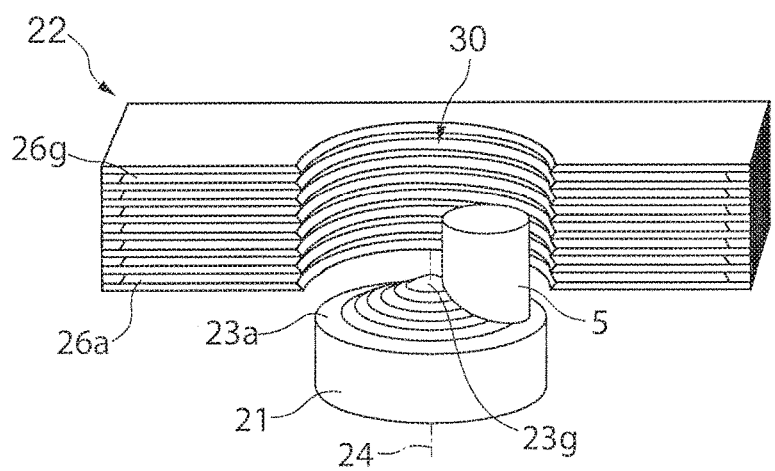
FIGS. 3A and 3B show illustrations similar to FIG. 2, in which the absorber device is shown in a cross-section view.
Figure 3B:
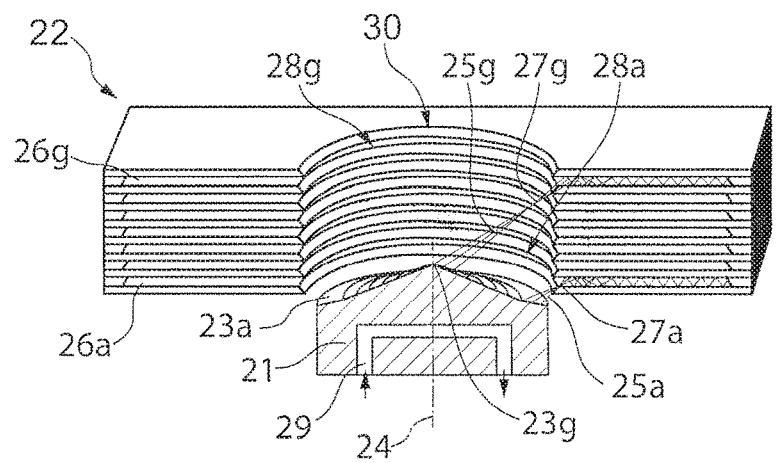

As can be seen in FIG. 2 and in FIGS. 3A and 3B, the beam trap 20 has a reflector 21 and an absorber device 22. The reflector 21 has a surface 21a, which forms a rotation-symmetrical lateral surface of the reflector 21 and is configured to be substantially conical. The surface 21a has a plurality of (e.g., seven in the example illustrated) segments in the form of reflector regions 23a-g. The reflector regions 23a-g are arranged concentrically around the central axis 24 of the reflector 21. A seventh, central reflector region 23g, through the center of which the central axis 24 and the tip of the segmented surface 21a extend, forms a conical surface, and the further reflector regions 23a-f form ring surfaces.

As can be seen in FIG. 3A, the reflector 21 has a cylindrical main body, at the upper end of which the segmented surface 21a is formed. In the example shown, the reflector 21 is made of copper, which has a high reflectivity (e.g., >98%) for the incident laser beam 5. Provided in the solid main body of the reflector 21 are cooling channels 29, through which a cooling liquid, for example cooling water, is guided in order to cool the segmented surface 21a of the reflector 21.

Each of the reflector regions 23a-g has a different alignment (or a different curvature, see below) with respect to the beam direction of the laser beam 5, which is incident on the reflector 21 parallel to the central axis 24, with the result that a partial beam 25a-g of the laser beam 5 which is incident on a respective reflector region 23a-g is reflected into a respectively different direction, as is shown in FIG. 3B by way of example for the first and the seventh partial beams 25a, 25g. The reflector 21, or more precisely the segmented surface 21a of the reflector 21, thus forms a splitting mirror, e.g., the partial beams 25a-g of the laser beam 5 which are reflected at a respective reflector region 23a-g are reflected into different directions and are incident on different absorber regions of the absorber device 22, which are configured as absorber chambers 26a-g in the illustrated example. A partial beam 25a-g which enters an absorber chamber 26a-g can be completely absorbed in the associated absorber chamber 26a-g.

In the example shown in FIGS. 3A and 3B, the reflector regions 23a-g of the segmented surface 21a are configured as paraboloid surfaces, e.g., they each form a surface which extends rotation-symmetrically with respect to the central axis 24 of the reflector 21 and has a parabolic curvature in the radial direction. Since the (e.g., concavely curved) paraboloid surfaces 23a-g face away from the central axis 24, a partial beam 25a-g of the laser beam 5 which is incident on a respective paraboloid surface 23a-g is focused in each case onto a ring-shaped line focus 27a-g, which in the cross-sectional view shown in FIG. 3B is illustrated in each case in the form of a (e.g., focal) point. As an alternative to the configuration as paraboloid surfaces 23a-g, the reflector regions or individual ones of the reflector regions 23a-g of the segmented surface 21a can also be configured as (e.g., concavely curved) toroidal surfaces, which have a constant curvature or a constant radius of curvature in the radial direction. The reflector regions 23a-g that are configured as toroidal surfaces likewise reflect a respectively incident partial beam 25a-g onto a ring-shaped line focus 27a-g.

As can likewise be seen in FIG. 3B, the respective line focus 27a-g is formed between a reflector region 23a-g and the absorber chamber 26a-g which is associated therewith. By focusing a respective partial beam 25a-g between the reflector region 23a-g and the associated absorber chamber 26a-g, the respective partial beam 25a-g can be aligned in targeted fashion such that the radiant energy of the partial beam 25a-g that is reflected by a respective reflector region 23a-g enters a respective absorber chamber 26a-g completely through an entrance opening 28a-g. The entrance openings 28a-g of the absorber chambers 26a-g in the example shown are formed along a lateral surface of a cylindrical opening 30 of the absorber device 22, the cylindrical axis of which coincides with the central axis 24 of the reflector 21.

FIG. 4 shows a detail of the first absorber chamber 26a of the absorber device 22 in a cross-sectional view. The absorber chamber 26a has a first, planar absorber surface 31a, and a second, likewise planar absorber surface 32a, which is arranged parallel with respect to the first absorber surface 31a. The two absorber surfaces 31a, 32a are provided in the example shown with an absorbing coating which absorbs a proportion of more than 50% of the radiant energy that is incident on the respective absorber surface 31a, 32a, for example with a KEPLA-COAT coating. The absorber surfaces 31a, 32a have a low roughness so as to prevent the formation of scattered radiation.

A portion of the radiant energy of the first partial beam 25a that is not absorbed at a respective absorber surface 31a, 32a is reflected to and fro between the two parallel absorber surfaces 31a, 32a, as a result of which the radiant energy of the first partial beam 25a is nearly completely absorbed. A very small portion of the radiant energy of the partial beam 25a is incident on a termination surface 33a of the absorber chamber 26a, which is aligned at an angle α of 45° with respect to the second absorber surface 32a. The remaining radiant energy of the first partial beam 25a is reflected to and fro between the termination surface 33a and the second absorber surface 32a, until the radiant energy of the first partial beam 25a is completely absorbed. The angle α between the second absorber surface 32a and the termination surface 33a can possibly deviate from 45°, and lie, for example, between approximately 30° and 60°. In the case that non-absorbed radiation leaves the absorber chamber 26a through the entrance opening 28a, this radiation can only pass back to the reflector 21 if it travels through the line focus 27a.

The first and second absorber surfaces 31a, 32a in the example shown are formed on a first and second metallic plate-like component 31, 32. The termination surface 33a is formed on a further plate-like component 33 in the form of a metal sheet. The termination surface 33a is here formed as an inclined edge or chamfer on a circular opening in the further plate-like component 33. For producing the first absorber chamber 26a, the three components 31-33 are placed one above the other and can be permanently, for example integrally, connected to one another. The integral connection of the three components 31-33 can be achieved e.g., by way of adhesive bonding. The three components 31-33 are preferably connected to one another by way of soldering, e.g., in a soldering furnace using a soldering film. The three permanently interconnected plate-like components 31, 32, 33 form a plate module, in which a respective absorber chamber 26a is formed.

By stacking a plurality of such plate modules one above the other, the absorber device 22 can be implemented in a layer-wise construction, which significantly simplifies the production of the absorber device 22. The stacked plate modules may be fixed in their relative location with respect to one another by way of a holder, without needing an integral connection of the individual plate modules for this purpose.

It is possible here for the two sides of a respective first or second (structurally identical) plate-like component 31, 32 that are located opposite one another to be used as absorber surfaces. In this case, the mutually opposite side faces of a respective plate-like first or second component 31, 32 in each case form an absorber surface in one of two mutually adjacent absorber chambers. In this case, all plate-like components of the absorber arrangement 22 can be connected to one another and thus be fixed in their relative location with respect to one another.

Figure 4A:
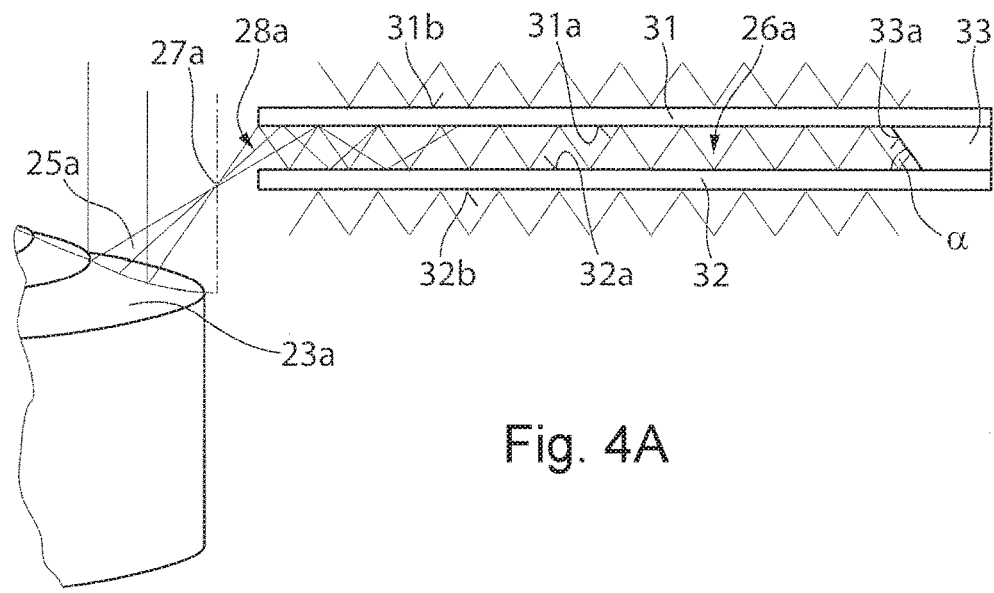
FIG. 4A shows an illustration of a detail of the beam trap of FIG. 2 and FIGS. 3A and 3B having an absorber chamber in which a partial beam of the laser beam which is reflected at a segmented surface of the reflector is reflected multiple times and absorbed.
Figure 4B:
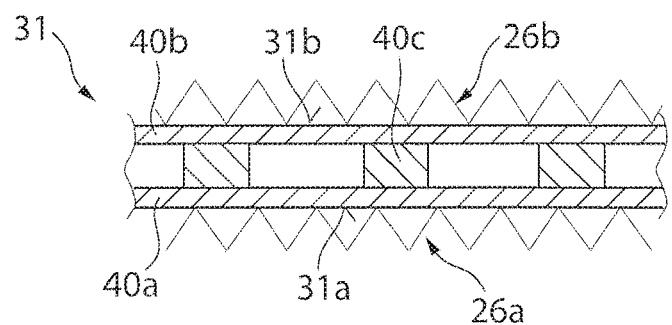
FIG. 4B shows an illustration of a plate-like component which delimits the absorber chamber of FIG. 4A and is composed of three plates.

FIG. 4B shows a detail illustration of a first plate-like component 31, which forms the upper absorber surface 31a of the absorber chamber 26a that is shown in FIG. 4A. The plate-like component 31 has two external plates 40a, 40b, which are configured as full surfaces—aside from the circular cylindrical opening 30—and between which an internal plate 40c is arranged. The upper absorber surface 31a of the first absorber chamber 26a is formed on the underside of the plate 40a which is the lower plate in FIG. 4B. The lower absorber surface 31b of the second absorber chamber 26b is formed on the top side of the plate 40b, which is the upper plate in FIG. 4B. The internal plate 40c is provided with an aperture and has cooling channels 41, one of which is illustrated by way of example in FIG. 4C (having an exemplary cooling channel geometry). The three plates 40a-c can be soldered together in the manner which is described further above or are possibly adhesively bonded together. A cooling liquid, for example in the form of cooling water, flows through the cooling channels 41.

Figure 4C:
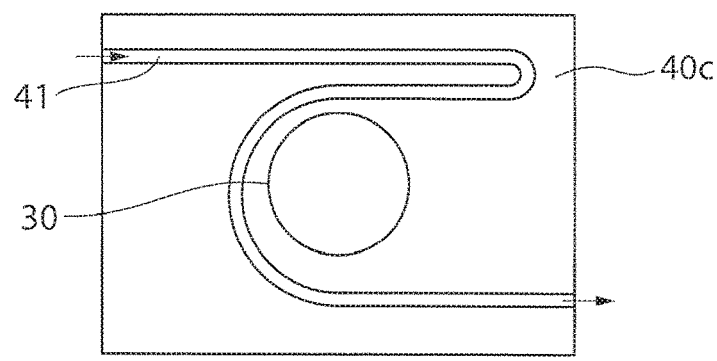
FIG. 4C shows a top view of the central one of the plates of FIG. 4B having a cooling channel formed therein.

The second plate-like component 32 and the further plate-like component 33 on which the termination surface 33a is formed can be configured likewise as shown in FIG. 4B and FIG. 4C, e.g., from a plurality of plates. In this way, the three components 31, 32, 33 can be cooled by way of a cooling liquid, for example in the form of cooling water, which can flow directly through the respective components 31, 32, 33 or the respective cooling channels 41 of a plate 40c in order to efficiently remove the radiant energy of the respective partial beam 25a-g. The layer-wise construction of the absorber device 22 facilitates the incorporation of the cooling channels 41 in the respective components 31-33. The entire absorber device 20 can be surrounded by a cooling device (not illustrated), through which a cooling fluid, e.g., cooling water, flows, in order to receive the absorbed radiant energy.

In the absorber device 22 shown further above, the reflector regions 23a-g of the segmented surface 21a of the reflector 21 are configured such that the reflected partial beams 25a-g are incident, through a respective entrance opening 28a-g, on one of the parallel absorber surfaces 31a, 32a substantially at an angle of 45°. In this way, an arbitrary number of reflections can occur at the same angle (e.g., theoretically). However, is to be understood that in principle, there are a multiplicity of possible angles at which the reflection can take place in a respective absorber chamber 26a-g. It is therefore not absolutely necessary for the absorber surfaces 31a, 32a of the respective absorber chamber 26a-g to be aligned parallel with respect to one another.

Even at high radiant powers of the incident (e.g., pulsed) laser beam 5 of e.g., more than 100 kW, it is possible to implement a beam trap 20 in the manner described further above, in which practically no back reflections occur, e.g., in which even at such high radiant powers the unavoidable proportion of the radiant power that leaves the beam trap 20 can be reduced to a few milliwatts or less. In addition, the beam trap 20 which is described further above can be implemented with a comparatively small installation space.

A number of embodiments have been described. Nevertheless, it will be understood that various modifications may be made without departing from the spirit and scope of the invention. Accordingly, other embodiments are within the scope of the following claims.

What is claimed is:

1. A beam trap comprising:
a reflector configured to reflect a beam that is incident on a surface of the reflector, and an absorber device arranged to absorb the reflected beam,
wherein the surface of the reflector is segmented and comprises a plurality of reflector regions, wherein each reflector region is configured to reflect a respective portion of the beam incident on the reflector region into a corresponding absorber region of the absorber device, and
wherein each absorber region of the absorber device defines a respective absorber chamber comprising a respective entrance opening for receiving a respective portion of the beam.

2. The beam trap as claimed in claim 1, wherein the surface of the reflector defines a circumferential and rotationally-symmetric lateral surface of the reflector.

3. The beam trap as claimed in claim 1, wherein the plurality of reflector regions are arranged concentrically around a central axis of the reflector.

4. The beam trap as claimed in claim 1, wherein the plurality of reflector regions are paraboloid surfaces or toroidal surfaces.

5. The beam trap as claimed in claim 4, wherein, for each paraboloid surface or toroidal surface, a respective ring-shaped line focus of the paraboloid surface or the toroidal surface is formed between the paraboloid or the toroidal surface and the corresponding absorber region.

6. The beam trap as claimed in claim 1, wherein the absorber device defines a cylindrical opening for the passage of the beam to the surface of the reflector.

7. The beam trap as claimed in claim 1, wherein the reflector is composed, at least in part, of a metallic material.

8. The beam trap as claimed in claim 1, wherein each entrance opening is ring-shaped.

9. The beam trap as claimed in claim 8, wherein each absorber chamber is formed between two respective planar absorber surfaces having a parallel alignment.

10. The beam trap as claimed in claim 8, wherein each absorber chamber comprises a termination surface disposed between two respective absorber surfaces at an end opposite to the entrance opening.

11. The beam trap as claimed in claim 10, wherein, for each absorber chamber, the termination surface is aligned at an angle ($\alpha$) of between 30° and 60° with respect to the two respective absorber surfaces.

12. The beam trap as claimed in claim 8, wherein, for each absorbed chamber, the two respective absorber surfaces and the respective termination surface are formed by three plate-like metallic components.

13. The beam trap as claimed in claim 12, wherein at least one of the components comprises a plurality of plates that are connected to one another by way of soldering.

14. The beam trap as claimed in claim 13, wherein at least one cooling channel is defined in at least one of the plates.

15. A beam guide device, comprising:
a beam trap comprising:
a reflector configured to reflect a beam that is incident on a surface of the reflector, and an absorber device arranged to absorb the reflected beam,
wherein the surface of the reflector is segmented and comprises a plurality of reflector regions, wherein each reflector region is configured to reflect a respective portion of the beam incident on the reflector region into a corresponding absorber region of the absorber device, and
wherein at least one of:
(i) each absorber region of the absorber device defines a respective absorber chamber comprising a respective entrance opening for receiving a respective portion of the beam, or
(ii) the plurality of reflector regions are paraboloid surfaces or toroidal surfaces, and, for each paraboloid surface or toroidal surface, a respective ring-shaped line focus of the paraboloid surface or the toroidal surface is formed between the paraboloid or the toroidal surface and the corresponding absorber region.

16. The beam guide device as claimed in claim 15, wherein the beam guide device is configured to guide a $CO_2$ laser beam or a solid-state laser beam.

17. An EUV beam generation apparatus, comprising:
a beam generation device configured to generate a laser beam,
a vacuum chamber configured to accept a target material within a target region for generating EUV radiation, and
a beam guide device comprising:
a beam trap comprising:
a reflector configured to reflect a laser beam that is incident on a surface of the reflector, and an absorber device arranged to absorb the reflected beam,
wherein the surface of the reflector is segmented and comprises a plurality of reflector regions, wherein each reflector region is configured to reflect a respective portion of the laser beam incident on the reflector region into a corresponding absorber region of the absorber device.

18. A beam trap comprising:
a reflector configured to reflect a beam that is incident on a surface of the reflector, and an absorber device arranged to absorb the reflected beam,
wherein the surface of the reflector is segmented and comprises a plurality of reflector regions, wherein each reflector region is configured to reflect a respective portion of the beam incident on the reflector region into a corresponding absorber region of the absorber device,
wherein the plurality of reflector regions are paraboloid surfaces or toroidal surfaces, and
wherein, for each paraboloid surface or toroidal surface, a respective ring-shaped line focus of the paraboloid surface or the toroidal surface is formed between the paraboloid or the toroidal surface and the corresponding absorber region.

* * * * *